(12) United States Patent
Counterman et al.

(10) Patent No.: US 8,556,614 B2
(45) Date of Patent: Oct. 15, 2013

(54) MOLDING PRESS

(76) Inventors: Jeff M. Counterman, Angola, IN (US);
Derek E. Craig, Ashley, IN (US)

( * ) Notice: Subject to any disclaimer, the term of this patent is extended or adjusted under 35 U.S.C. 154(b) by 0 days.

(21) Appl. No.: 13/431,488

(22) Filed: Mar. 27, 2012

(65) Prior Publication Data
US 2012/0251658 A1    Oct. 4, 2012

Related U.S. Application Data

(60) Provisional application No. 61/468,392, filed on Mar. 28, 2011.

(51) Int. Cl.
*B29C 45/64* (2006.01)

(52) U.S. Cl.
USPC .................... 425/190; 425/451.9; 425/595

(58) Field of Classification Search
USPC ....................... 425/190, 451.9, 595
See application file for complete search history.

(56) References Cited

U.S. PATENT DOCUMENTS

| | | | |
|---|---|---|---|
| 2,000,406 A * | 5/1935 | Michelson | 425/47 |
| 2,776,854 A * | 1/1957 | Billstrom | 292/256 |
| 3,199,159 A * | 8/1965 | Wernecke | 425/595 |
| 3,659,994 A * | 5/1972 | Ehrlich | 425/595 |
| 5,143,736 A * | 9/1992 | Kumamura et al. | 425/589 |
| 5,196,150 A | 3/1993 | Mimura et al. | |
| 5,238,387 A * | 8/1993 | Hama et al. | 425/451.9 |
| 5,354,525 A | 10/1994 | Fujimoto et al. | |
| 5,375,991 A * | 12/1994 | Rydmann et al. | 425/595 |
| 6,264,458 B1 * | 7/2001 | Marcuz et al. | 425/451.9 |
| 6,702,566 B1 * | 3/2004 | Bellasalma et al. | 425/451.9 |
| 6,851,942 B2 | 2/2005 | Wohlrab | |
| 7,491,050 B2 | 2/2009 | Dieno et al. | |
| 7,690,915 B2 | 4/2010 | Furutani et al. | |
| 2009/0011072 A1 | 1/2009 | Glaesener et al. | |
| 2012/0021086 A1 * | 1/2012 | Ossanai et al. | 425/451.9 |

* cited by examiner

*Primary Examiner* — James Mackey
(74) *Attorney, Agent, or Firm* — Taylor IP, P.C.

(57) ABSTRACT

A mold press for use with an injection mold, the mold press including a first press section connectable to a first portion of the injection mold, a second press section connectable to a second portion of the injection mold and a locking arm system. The locking arm system being configured to secure the first press section to the second press section. The locking arm system including at least one structural member coupled with the first press section, and at least one swing arm pivotally connected to the second press section. The swing arm encounters the structural member and interacts with the structural member to draw the first and second press sections toward each other causing the first and second portions of the mold to become proximate each other.

18 Claims, 9 Drawing Sheets

MOLDING PRESS

CROSS REFERENCE TO RELATED APPLICATIONS

This is a non-provisional application based upon U.S. provisional patent application Ser. No. 61/468,392, entitled "INJECTION MOLDING PRESS", filed Mar. 28, 2011, which is incorporated herein by reference.

BACKGROUND OF THE INVENTION

1. Field of the Invention

The present invention relates to a molding press, and, more particularly, to a molding press for large injection molds.

2. Description of the Related Art

Molding presses are used as part of a manufacturing process for the production of parts made from thermoplastic or thermosetting plastic materials. Material granules are fed into a heated container where they are mixed, and then pressurized into a mold cavity where the material cools and hardens to the configuration of the cavity. A toolmaker machines the mold from metal to form the features of the desired part. Injection molding techniques are used for the manufacture of a variety of parts, from the smallest component to entire body panels of vehicles.

A press is used to temporarily hold mold halves together while the heated material is injected under high pressure. The press has to hold the mold halves together without allowing any separation of the mold halves during the injection of the material to avoid the formation of flash, and to avoid the manufacture of scrap parts. In order to be effective the press has to be rigid and able to provide a significant pressure to hold the mold together.

Advantages of injection molding processes are relatively high production rates, repeatable tolerances, the use of a wide range of materials, the use of less skilled labor, low scrap losses, and the parts having a finished look after coming from the mold. Disadvantages of the injection molding process include equipment investment, environmental concerns, and energy costs. A difficulty in molding large parts is the need for a repeatable, reliable system for positioning and holding the mold.

What is needed in the art is a large molding press capable of repeatable consistent positioning of the mold portions for the efficient molding of large parts.

SUMMARY OF THE INVENTION

The present invention provides a molding press that has an apparatus to adjust to different mold thicknesses and to consistently make production parts.

The invention in one form is directed to a press system for use with an injection mold. The press system includes a first press section having a first portion of the mold attached thereto and a second press section having a second portion of the mold attached thereto. The press system also includes a locking arm system. The locking arm system is configured to secure the first press section to the second press section with the first portion of the mold and the second portion of the mold therebetween. The locking arm system includes at least one structural member coupled to the first press section and at least one swing arm pivotally connected to the second press section. The at least one swing arm encountering the at least one structural member. The at least one swing arm interacts with the at least one structural member to draw the first press section and the second press section toward each other causing the first portion of the mold and the second portion of the mold to be proximate each other.

The invention in another form is directed to a mold press for use with an injection mold, the mold press including a first press section connectable to a first portion of the injection mold, a second press section connectable to a second portion of the injection mold and a locking arm system. The locking arm system being configured to secure the first press section to the second press section. The locking arm system including at least one structural member coupled with the first press section, and at least one swing arm pivotally connected to the second press section. The swing arm encounters the structural member and interacts with the structural member to draw the first and second press sections toward each other causing the first and second portions of the mold to become proximate each other.

An advantage of the present invention is that it provides for the repeatable alignment of large mold halves.

Another advantage is that the present invention is easily repeatably adjusted for the accurate production of large molded products.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
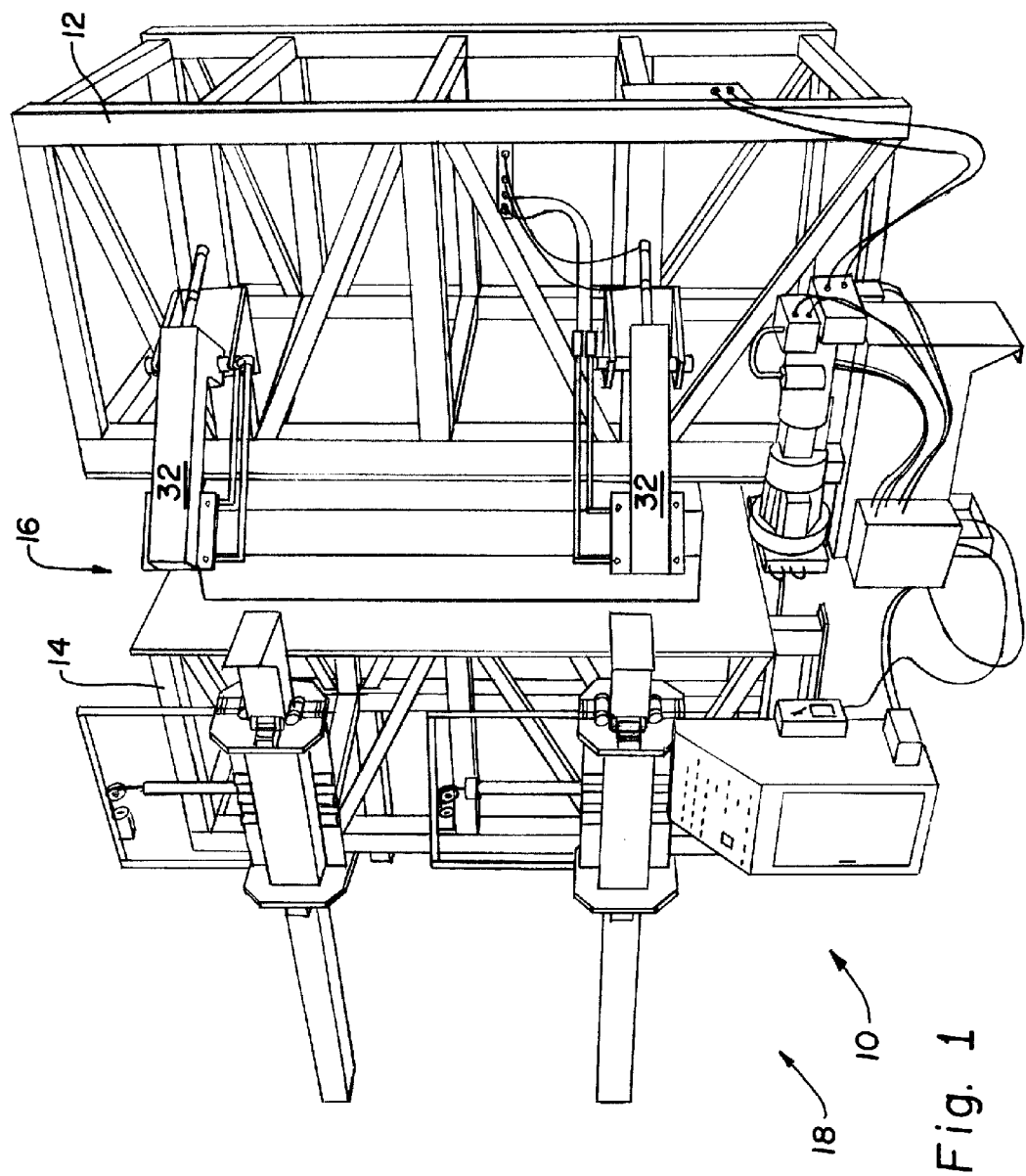
FIG. 1 is a perspective view of an embodiment of a molding press according to the present invention.
Figure 2:
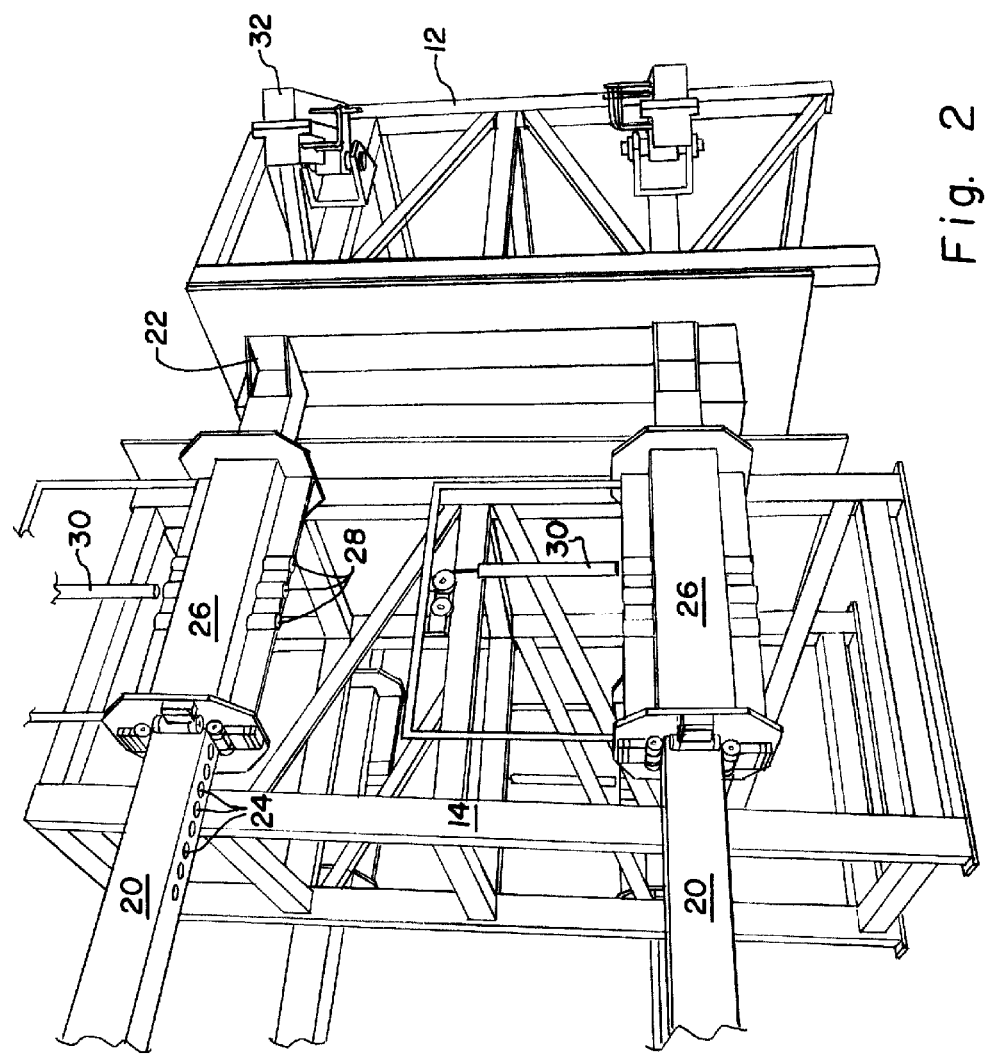
FIG. 2 is another perspective view of the molding press of FIG. 1.
Figure 3:
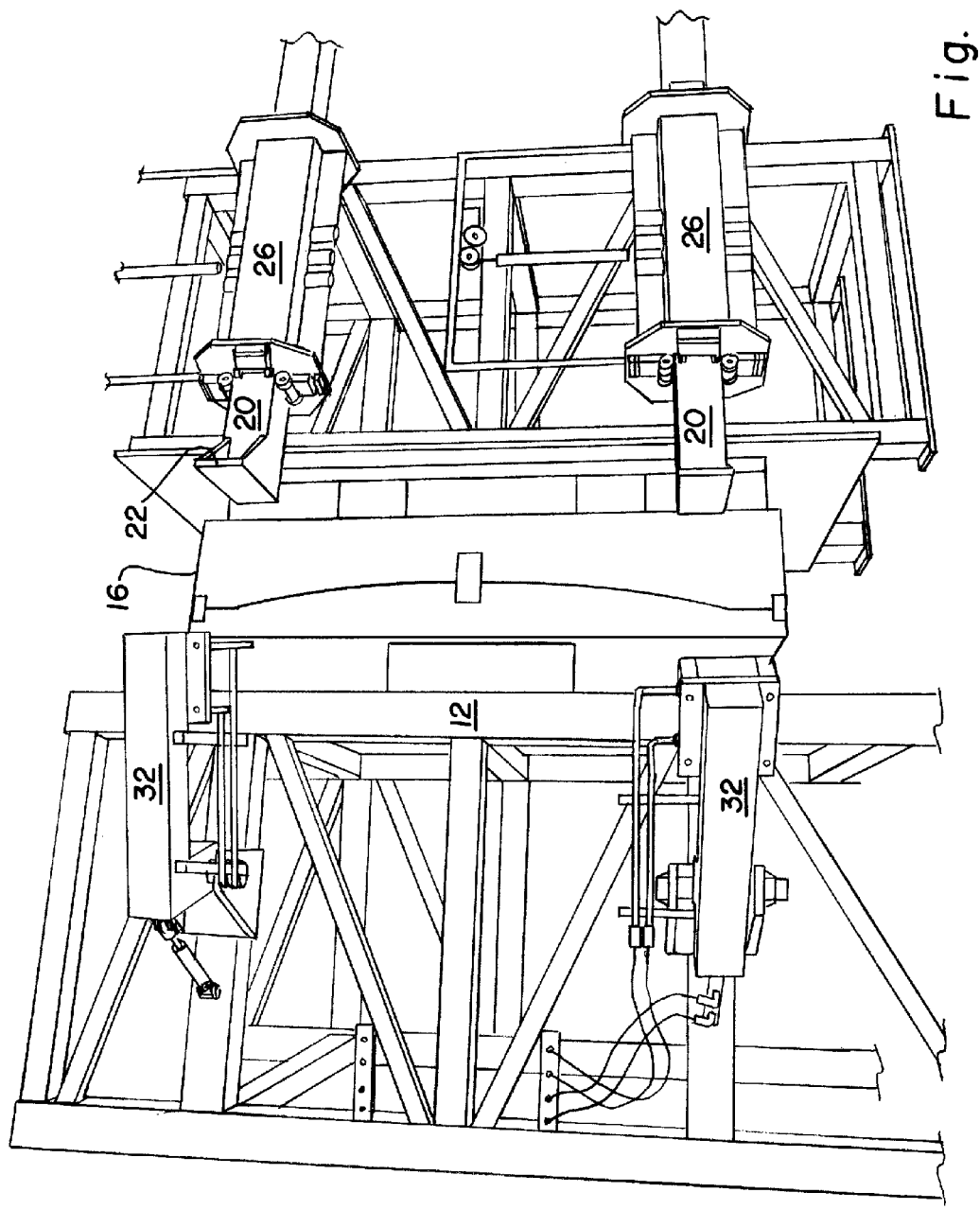
FIG. 3 is another perspective view from an opposite side of the molding press of FIGS. 1 and 2.

Referring now to the drawings, and more particularly to FIGS. 1-3, there is shown perspective views of press system 10 for use in a molding process. Press system 10 includes a press section 12 and a press section 14, each of which interact with a mold 16. Press section 12 is illustrated as a stationary section, while press section 14 is illustrated as a movable section. Mold 16 typically has one half that is attached to press section 12 and one half that is attached to press section 14. Press sections 12 and 14 are separated for the removal of a part made by an injection process and then mold halves 16 are repositioned and secured for another injection process. Although press section 12 is illustrated as being stationary, it is also contemplated that it may be movable as well. Further, although movement is illustrated in a linear direction, other directions of movement are also contemplated.

Figure 4:
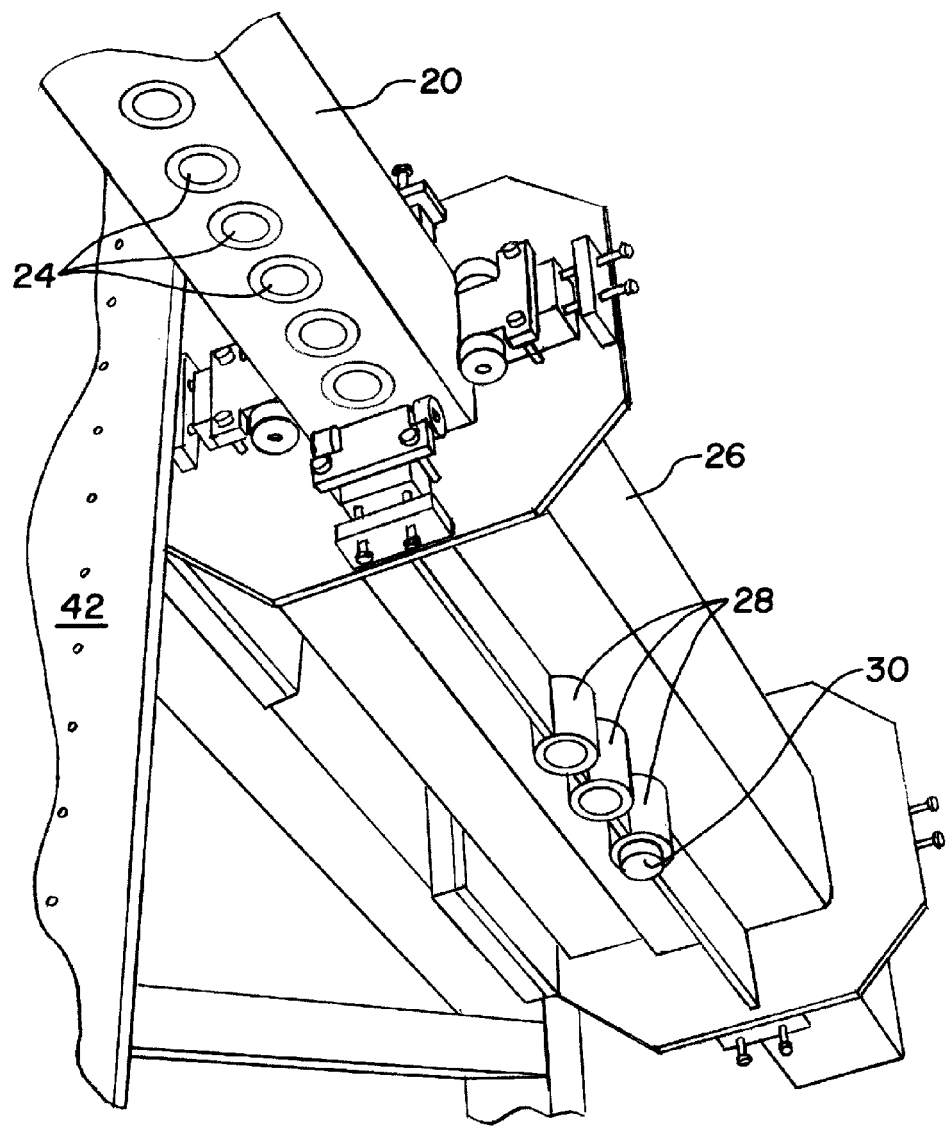
FIG. 4 is a perspective view of one of the adjustable features of the molding press of FIGS. 1-3.
Figure 5:
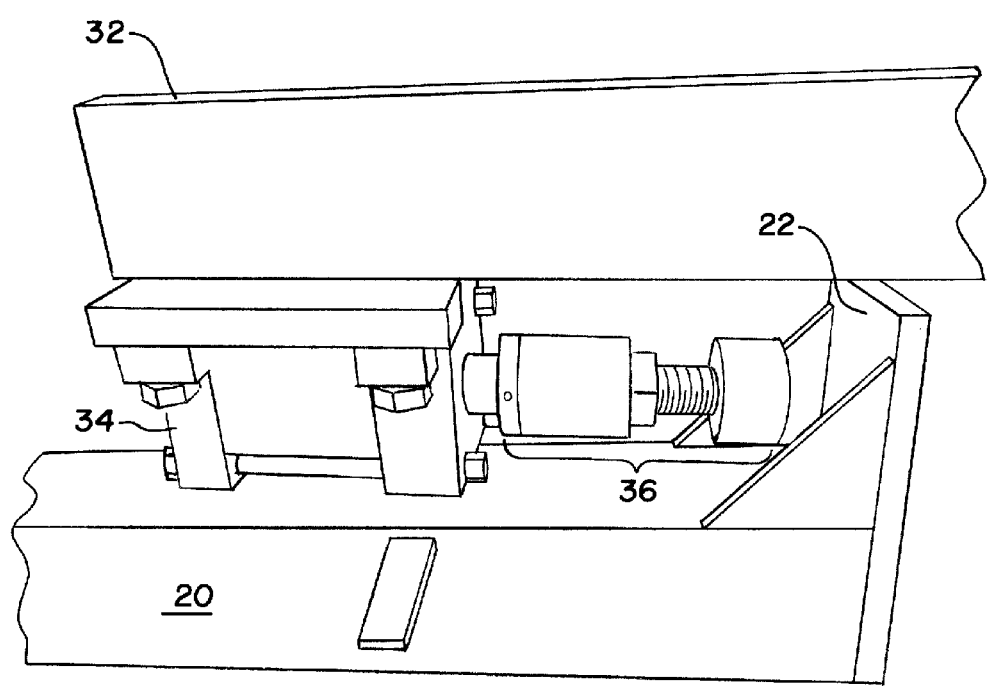
FIG. 5 is a view of the interaction between a swing arm and a structural member of the molding press of FIGS. 1-3.

Now additionally referring to FIGS. 4 and 5, press sections 12 and 14 are secured together by way of a locking arm system 18. Locking arm system 18 includes pinned structural members 20 and swing arms 32. Pinned structural members 20 each include a foot 22, a series of pin receiving tubes 24, a sleeve 26, pin receiving tubes 28 associated with sleeve 26, and a pin 30. Pin structural member 20 is a series of pin receiving tubes 24 along a length of the body of structural member 20. Pin receiving tubes 24 are equally spaced along structural member 20 and sized to receive pin 30. Sleeve 26 has several pin receiving tubes 28, which are positioned in an offset manner such that a series of pin receiving tubes 28, illustrated as being three tubes existing on each side of sleeve 26, may be similar in diameter to pin receiving tubes 24. The spacing of pin receiving tubes 28 are different from the spacing of tubes 24 so that a variable positioning adjustment of structural member 20 may be accomplished. A particular pin receiving tube 24 is aligned with a particular pin receiving tube 28. Pin 30 is inserted to secure structural member 20 to press section 14 in a particular length adjustment. There may be a number of structural members 20 associated with corresponding sleeves 26 connected with press section 14. For example, there are illustrated four structural members 20 through four corresponding sleeves 26 in press section 14 of the figures.

Swing arms 32 are pivotally connected to press section 12 and are swung away from foot 22 as shown in FIGS. 1-3. Swing arm 32 is shown swung into position in FIG. 5 with hydraulic actuator 34 extending from a portion of swing arm 32 and when swing arm 32 is in its swung in position, then hydraulic actuator 22 is directed in a substantially parallel orientation relative to the longitudinal length of structural member 20. In addition to the stroke of hydraulic actuator 34, a length adjustment device 36 is connected to the end of the rod of hydraulic actuator 34. For a particular press setting, a course adjustment is accomplished by the selection of the positioning of pin 30 through a selected set of pin receiving tubes 24 and 28. Fine adjustment of the positioning of the mold halves 16 is accomplished by the positioning of length adjustment 36, which provides an infinite selection of positioning capability for mold 16.

During operation of press system 10, mold 16 has separate halves secured to press sections 12 and 14 respectively. Press section 14 is moved toward press section 12 for engagement of mold halves 16. The set up of press system 10 will have structural members 20 adjusted as well as length adjustment 36 so that when mold halves 16 are positioned proximate to their molding position, then swing arms 32 swing into position so that hydraulic actuators 34 are actuated to compress and hold mold 16 in an appropriate position. Then the melted resins are injected under pressure into mold 16 to form the part(s).

Once the injection portion of the molding operation is complete then, in reverse order to the previous steps, hydraulic actuator 34 is retracted, swing arms 32 are swung outwardly away from mold halves 16 and press section 14 is moved in a linear fashion away from press section 12. As the mold halves separate, the molded part is removed from mold 16 and then the operation can be repeated.

Figure 6:
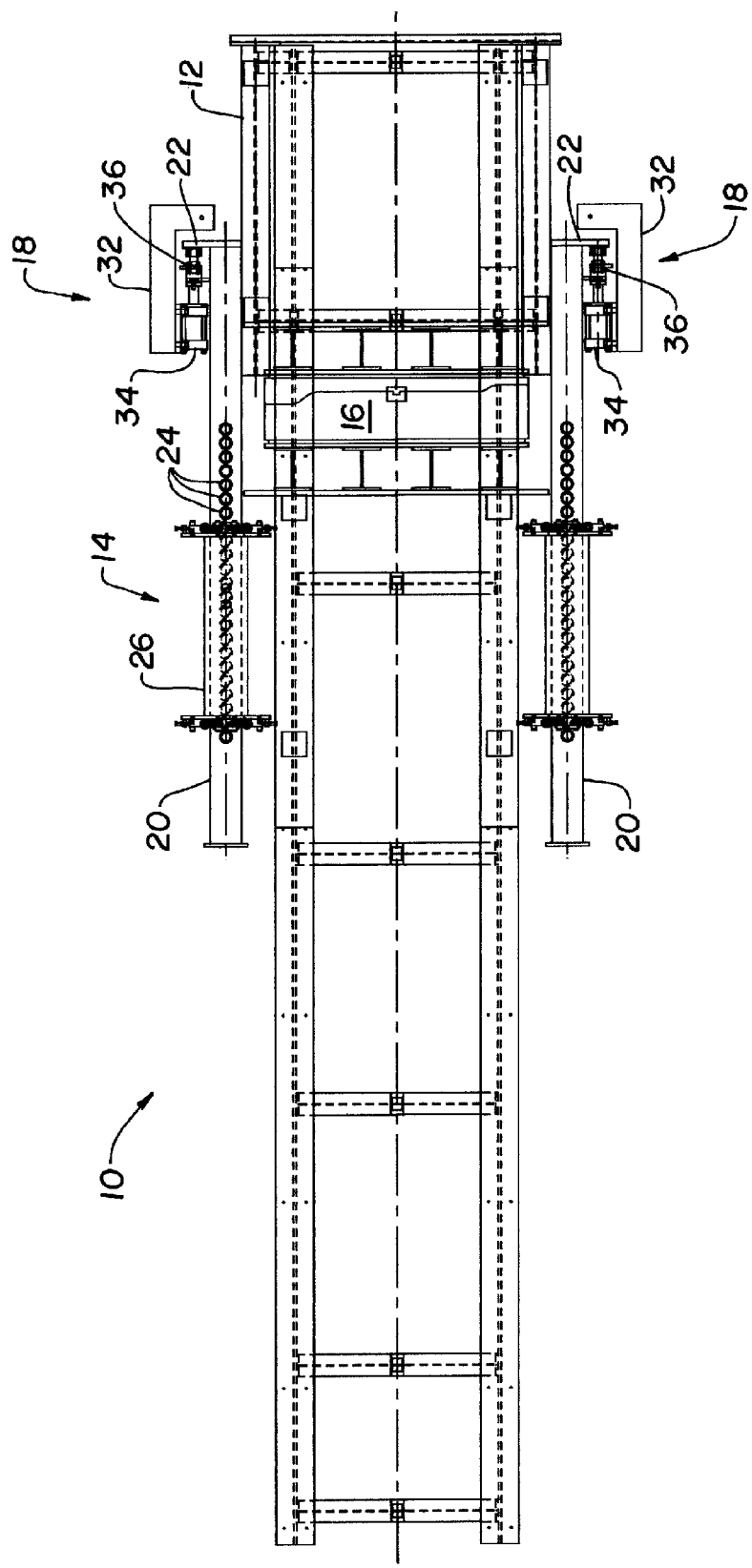
FIG. 6 is a top plan view of the molding press of FIGS. 1-3.

Now, additionally referring to FIGS. 6-9, there is shown in a schematical fashion press system 10 from different perspectives. In FIG. 6, press system 10 is illustrated from a top view with swing arms 32 swung into position and hydraulic actuators 34 being extended so that adjustment mechanism 36 is in contact with foot 22 of each structural member 20.

Figure 7:
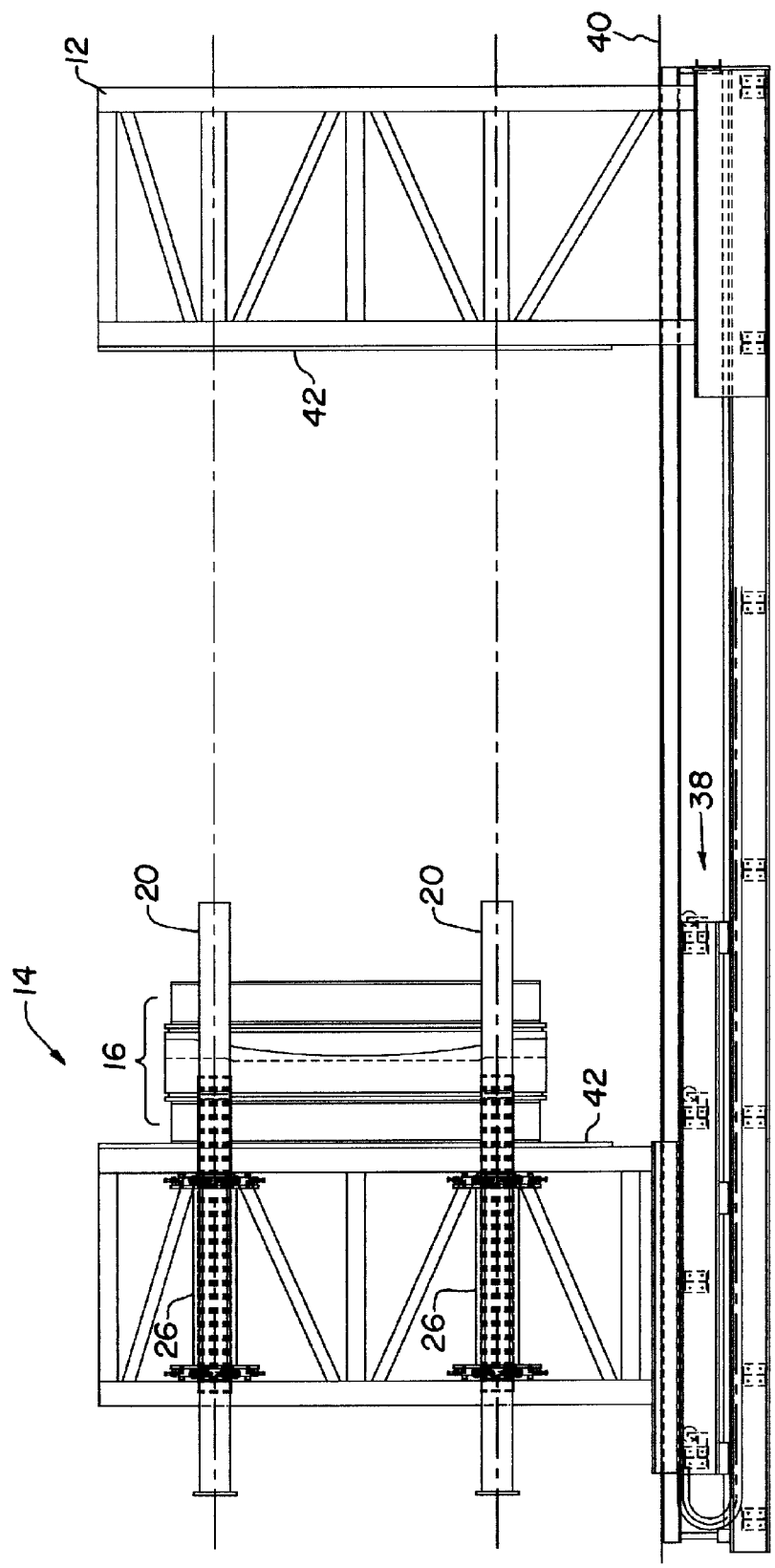
FIG. 7 is a side plan view of the two section of the molding press of FIGS. 1-3 and 6, with the mold in the process of being installed or removed.

In FIG. 7, mold halves 16 are connected to mold mounting plate 42 of press section 14. This illustrates a set up (or removal) procedure where mold 16, that consists of two halves, are latched together and then mounted to mounting plate 42 of press section 14, using moving equipment, not shown. Press section 14 then is moved in a linear manner towards press section 12 where one half of mold 16 is then mounted to mounting plate 42 of press section 12. The reverse process is undertaken for the removal of mold 16. Mounting plates 42 of each section may be identical or substantially similar and consist of a plate having numerous mounting holes therein, to which fasteners may be positioned to hold various molds 16 in position. The movement of press section 14 is carried out by a press section movement mechanism 38, which may largely be below floor level 40 and may consist of a mechanical drive system, such as a chain drive system or some other system such as a hydraulic system for the controlled movement of press section 14.

Figure 8:
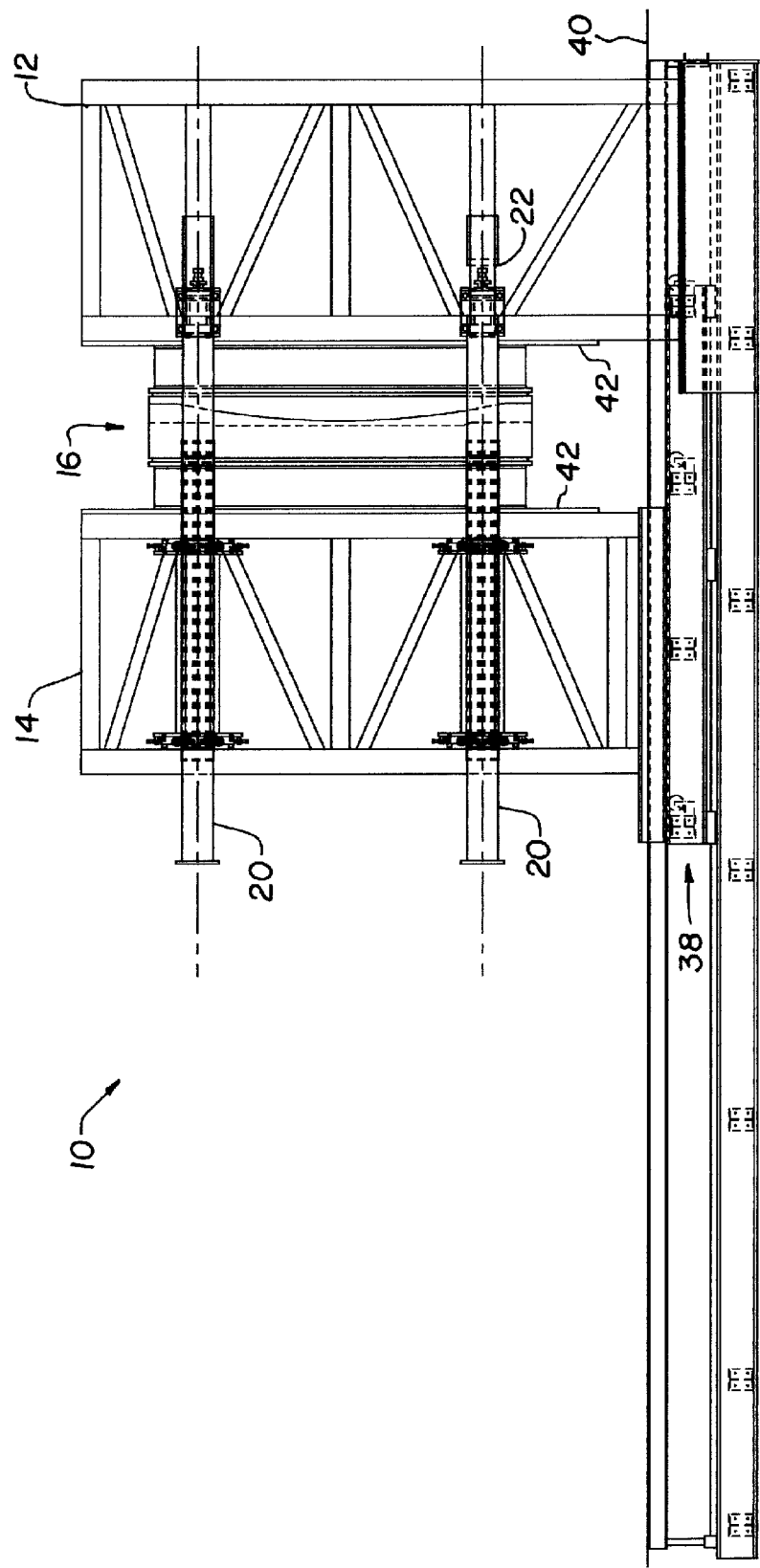
FIG. 8 is a side plan view of the two section of the molding press of FIGS. 1-3, 6 and 7, with the mold in place for the molding operation.
Figure 9:
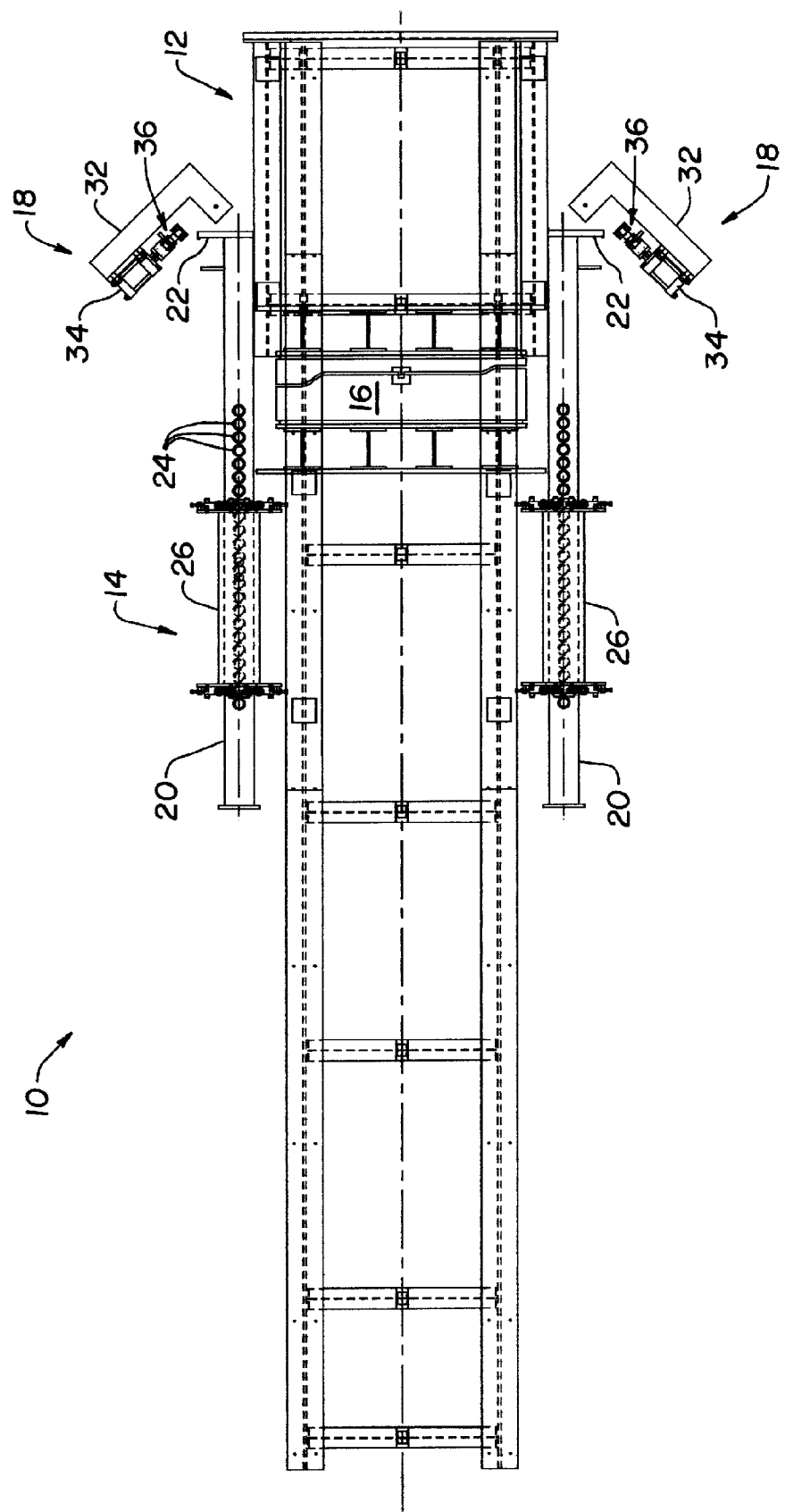
FIG. 9 is a top plan view of the molding press of FIGS. 1-3, 6, 7 and 8, with the swing arms disengaged from the structural members.

In FIG. 8, there is illustrated the position of press sections 12 and 14 that are brought together with portions of the elements either left off or shown in a schematic fashion. In FIG. 9, there is illustrated swing arms 32 being swung outwardly away from mold 16 to allow the linear movement of press section 14 away from press section 12. This figure can also illustrate the time before the swing arms 32 are swung into position to prepare for a molding process.

Press system 10 utilizes a linear tracking process of bringing one half of mold 16 into an adjoining relationship with the other half of mold 16. Advantageously, the present invention is adaptable so that the press can be adjusted to different mold depths. This is accomplished through an infinitely adjustable locking arm system 18 that has two primary components. The first component is a long structural member 20 with a series of holes therethrough as discussed above. Long structural member 20 is positioned to roughly fit the length required for compression of mold 16. The second component is an adjusting ram on the head of hydraulic actuator 34 and it is the infinite fine tuning of length adjustment device 36 that allows the compression depth to accommodate virtually any mold width. Advantageously, the hydraulic actuators 34 are positioned and aligned such that a squeezing effect on mold 16 occurs during the injection and cure cycles that occur within mold 16.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press system for use with an injection mold, the press system comprising:
   a first press section having a first portion of the mold attached thereto;
   a second press section having a second portion of the mold attached thereto; and
   a locking arm system being configured to secure said first press section to said second press section with the first portion of the mold and the second portion of the mold therebetween, said locking arm system including:

at least one structural member coupled with one of said first press section and said second press section; and at least one swing arm pivotally connected to the other one of said first press section and said second press section, said at least one swing arm encountering said at least one structural member, said at least one swing arm interacting with said at least one structural member to draw said first press section and said second press section toward each other causing the first portion of the mold and the second portion of the mold to be proximate each other, said at least one structural member being slidable relative to at least one of said first press section and said second press section.

2. The press system of claim 1, wherein said at least one structural member is coupled with said first press section and said at least one swing arm is pivotally connected to said second press section.

3. The press system of claim 2, wherein said locking arm system further includes an actuator connected to one of said structural member and said swing arm, said actuator being configured to push said swing arm and said structural member in opposite directions as the first portion and the second portion of the mold are pressed together.

4. The press system of claim 3, wherein said actuator is connected to said swing arm, said actuator configured to press against said structural member.

5. The press system of claim 4, wherein said actuator has a length adjustment device connected thereto, said length adjustment device being configured to vary the fully extended length of the combination of said actuator and said length adjustment device.

6. The press system of claim 1, wherein said locking arm system additionally includes at least one pin associated with said at least one structural member, said at least one structural member having at least one receiving tube therein, said first press section having at least one pin receiving structure, said at least one pin extending through said receiving tube and said pin receiving structure to thereby secure said at least one structural member to said first press section.

7. The press system of claim 6, wherein said at least one receiving tube of said at least one structural member is a plurality of receiving tubes, said plurality of receiving tubes and said at least one pin receiving structure coacting to accommodate a thickness of the mold.

8. The press system of claim 7, wherein said at least one pin receiving structure is a plurality of pin receiving structures having a first spacing in a longitudinal direction of the press system, said receiving tubes having a second spacing in said longitudinal direction, said first spacing and said second spacing being different.

9. The press system of claim 8, wherein said at least one swing arm is pivotally connected to said second press section, said locking arm system further including an actuator connected to said swing arm, said actuator being configured to push said swing arm and said structural member in opposite directions thereby pressing together the first portion and the second portion of the mold.

10. A mold press for use with an injection mold, the mold press comprising:

a first press section connectable to a first portion of the injection mold;

a second press section connectable to a second portion of the injection mold; and a locking arm system configured to secure said first press section to said second press section, said locking arm system including:

at least one structural member coupled with one of said first press section and said second press section; and at least one swing arm pivotally connected to the other one of said first press section and said second press section, said at least one swing arm encountering said at least one structural member, said at least one swing arm interacting with said at least one structural member to draw said first press section and said second press section toward each other causing the first portion of the mold and the second portion of the mold to become proximate each other, said at least one structural member being slidable relative to at least one of said first press section and said second press section.

11. The mold press of claim 10, wherein said at least one structural member is coupled with said first press section and said at least one swing arm is pivotally connected to said second press section.

12. The mold press of claim 11, wherein said locking arm system further includes an actuator connected to one of said structural member and said swing arm, said actuator being configured to push said swing arm and said structural member in opposite directions.

13. The mold press of claim 12, wherein said actuator is connected to said swing arm, said actuator configured to press against said structural member.

14. The mold press of claim 13, wherein said actuator has a length adjustment device connected thereto, said length adjustment device being configured to vary the fully extended length of the combination of said actuator and said length adjustment device.

15. The mold press of claim 10, wherein said locking arm system additionally includes at least one pin associated with said at least one structural member, said at least one structural member having at least one receiving tube therein, said first press section having at least one pin receiving structure, said at least one pin extending through said receiving tube and said pin receiving structure to thereby secure said at least one structural member to said first press section.

16. The mold press of claim 15, wherein said at least one receiving tube of said at least one structural member is a plurality of receiving tubes, said plurality of receiving tubes and said at least one pin receiving structure coacting to accommodate a thickness of the mold.

17. The mold press of claim 16, wherein said at least one pin receiving structure is a plurality of pin receiving structures having a first spacing in a longitudinal direction of the mold press, said receiving tubes having a second spacing in said longitudinal direction, said first spacing and said second spacing being different.

18. The mold press of claim 17, wherein said at least one swing arm is pivotally connected to said second press section, said locking arm system further including an actuator connected to said swing arm, said actuator being configured to push said swing arm and said structural member in opposite directions.

* * * * *